(12) United States Patent
Pääkkönen et al.

(10) Patent No.: US 12,122,700 B2
(45) Date of Patent: Oct. 22, 2024

(54) METHOD AND APPARATUS FOR REMOVING IRON FROM HUMUS-RICH WATER

(71) Applicant: Allwatec Oy, Hämeenlinna (FI)

(72) Inventors: Jorma Pääkkönen, Helsinki (FI); Timo Tolonen, Hämeenlinna (FI)

(73) Assignee: Allwatec Oy, Hämeenlinna (FI)

( * ) Notice: Subject to any disclaimer, the term of this patent is extended or adjusted under 35 U.S.C. 154(b) by 374 days.

(21) Appl. No.: 17/610,227

(22) PCT Filed: May 5, 2020

(86) PCT No.: PCT/FI2020/050301
§ 371 (c)(1),
(2) Date: Nov. 10, 2021

(87) PCT Pub. No.: WO2020/229727
PCT Pub. Date: Nov. 19, 2020

(65) Prior Publication Data
US 2022/0340465 A1   Oct. 27, 2022

(30) Foreign Application Priority Data
May 10, 2019 (FI) ....................... 20195391

(51) Int. Cl.
*C02F 1/00* (2023.01)
*C02F 1/66* (2023.01)
(Continued)

(52) U.S. Cl.
CPC ................ *C02F 9/00* (2013.01); *C02F 1/008* (2013.01); *C02F 1/66* (2013.01); *C02F 3/04* (2013.01);
(Continued)

(58) Field of Classification Search
CPC .. C02F 9/00; C02F 1/001; C02F 1/008; C02F 1/52; C02F 1/5209; C02F 1/64;
(Continued)

(56) References Cited

U.S. PATENT DOCUMENTS

| 4,459,149 A | 7/1984 | Moran et al. |
| 6,569,336 B1 * | 5/2003 | Mouchet .................. C02F 3/04 |
| | | 210/220 |

(Continued)

FOREIGN PATENT DOCUMENTS

| CN | 103391899 A * 11/2013 .............. C02F 1/004 |
| JP | 2011200829 A * 10/2011 ................ C02F 3/34 |

(Continued)

OTHER PUBLICATIONS

Sharma, "Adsorptive Iron Removal from Groundwater", Dissertation at Wageningen University, The Netherlands, Published Dec. 17, 2001. (Year: 2001).*

(Continued)

*Primary Examiner* — Joseph W Drodge
(74) *Attorney, Agent, or Firm* — Servilla Whitney LLC

(57) ABSTRACT

The invention relates to a method and apparatus for treating water. Iron is removed biologically from humus-rich water with the solution according to the invention. In the method, the water being treated is conveyed through a filter, which filter comprises filter material. Before the water is conveyed to the filter, the pH value of the water is lowered with an acidification part that is included in the apparatus.

10 Claims, 3 Drawing Sheets

Figure 1:
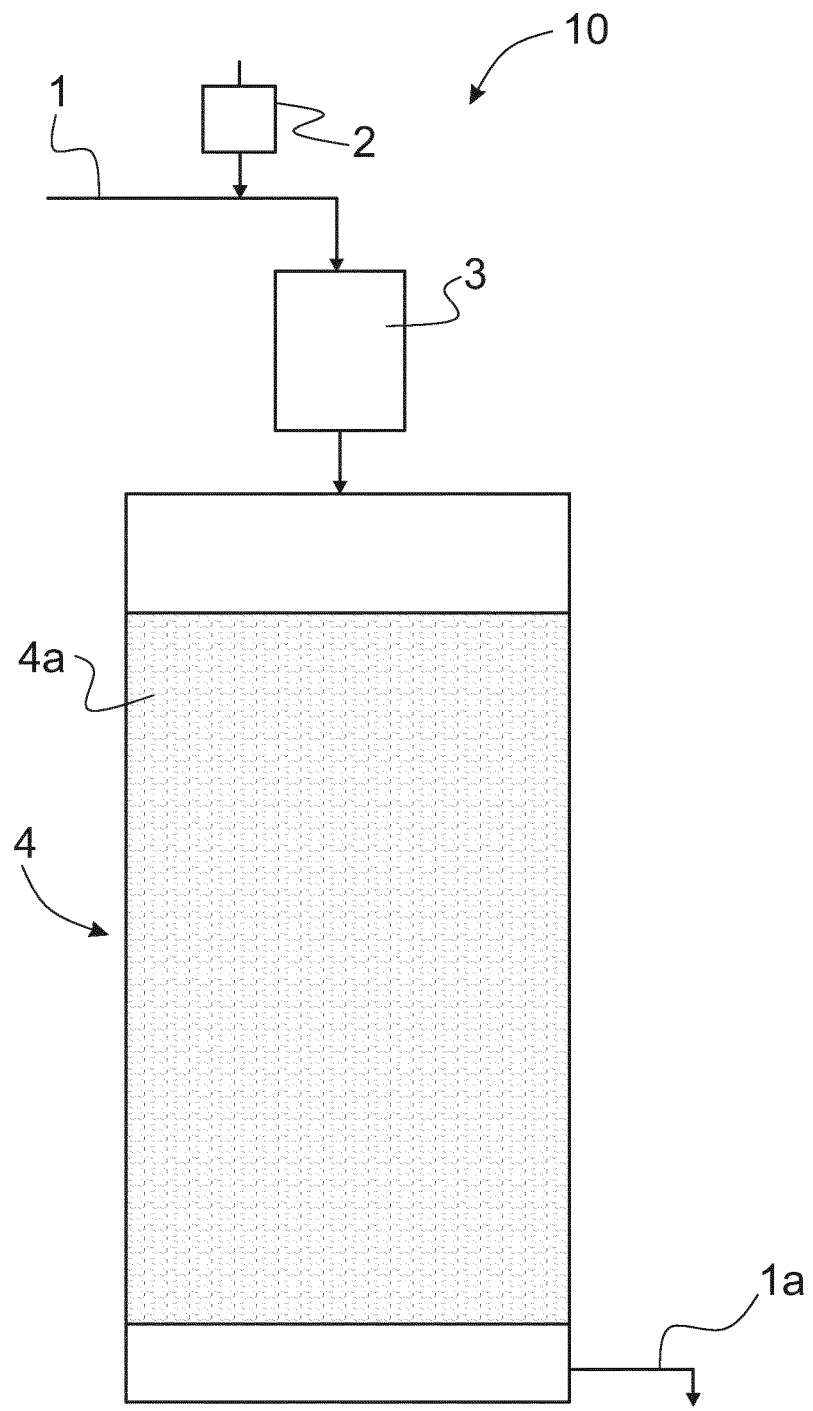

(51) Int. Cl.
  *C02F 3/04* (2023.01)
  *C02F 3/34* (2023.01)
  *C02F 9/00* (2023.01)
  *C02F 101/20* (2006.01)
  *C02F 101/30* (2006.01)
  *C02F 103/06* (2006.01)

(52) U.S. Cl.
  CPC ........ *C02F 3/346* (2013.01); *C02F 2101/203* (2013.01); *C02F 2101/30* (2013.01); *C02F 2103/06* (2013.01); *C02F 2209/003* (2013.01); *C02F 2209/06* (2013.01)

(58) Field of Classification Search
  CPC .... C02F 1/645; C02F 1/66; C02F 1/74; C02F 3/006; C02F 3/02; C02F 3/04; C02F 3/107; C02F 3/346; C02F 2101/203; C02F 2101/30; C02F 2103/06; C02F 2209/003; C02F 2209/06; C02F 2209/07; C02F 2209/20; C02F 2209/22; C02F 2303/16; Y02W 10/10

See application file for complete search history.

(56) References Cited

U.S. PATENT DOCUMENTS

2008/0210629 A1* 9/2008 Mankiewicz ............ B09C 1/10
  210/170.07
2010/0176044 A1* 7/2010 Domb .................... B01J 20/103
  210/287

FOREIGN PATENT DOCUMENTS

RU 2158231 C2 10/2000
WO WO-2007052085 A1 * 5/2007 ............ B09C 1/002

OTHER PUBLICATIONS

Park, Effects of iron species and inert minerals on coagulation and direct filtration for humic acid removal, Published in Desalination, vol. 239, 2009, pp. 146-158. (Year: 2009).*

English translation of Patent Publication JP 2011200829A, published Oct. 13, 2011. (Year: 2011).*

English translation of Patent Publication CN 103391899A, published Nov. 13, 2013. (Year: 2013).*

PCT Written Opinion in PCT/FI2020/05030 dated Aug. 26, 2020, 9 pages.

* cited by examiner

METHOD AND APPARATUS FOR REMOVING IRON FROM HUMUS-RICH WATER

FIELD OF THE INVENTION

The present invention relates to a method as defined in the preamble of claim 1.

Advantageously the invention relates to a method and apparatus for removing iron from humus-rich water. The method and apparatus of the invention, which are hereinafter referred to by the common designation "the solution of the invention", are applicable for use for purification of e.g. groundwater in water purification plants in areas where the groundwater contains iron and humus. The solution of the invention can also be used for treatment of other types of water besides groundwater.

Iron content is one of the variables that indicate the applicability of groundwater. If the iron content is high the applicability of the water as household water is low. The iron content of water is expressed as micrograms per litre of water (µg/l) or as milligrams per litre (mg/l). Iron causes gustatory and odour nuisances in household water. In swampy water systems iron content correlates with humus occurrence. In water iron ions form iron oxide and rust coloured compounds with oxygen, which make household water turbid and coloured, and stain the insides of household appliances that use the water.

Iron contents of groundwater and well water are affected, among other things, by the composition of the bedrock, the pH value of the water, the conditions for oxidation-reduction reactions and the amount of organic matter in the water. Iron dissolves to groundwater from bedrock minerals. Sand, gravel, and moraine contain iron, which dissolves to groundwater. When using concentrated water intake, the risk for taking too much iron is low as the iron content is monitored in water purification plants. Iron content of water can be detected from brown colour of drinking water or from precipitation of iron as rust blotches onto surfaces of household appliances.

Humus-rich groundwater contains usually more iron than normal. Iron content is a value that is typical for each water system. 400-600 µg/l can be considered a normal level. In very brown humus-rich waters, such as bog water, iron content can be up to 20.0 mg/l. High iron contents may occur even if humus content is low. In addition, groundwater of tilly soils is often iron-rich.

Iron can be a detrimental constituent in drinking water when occurring in too high levels. In a good quality household water iron content is below 0.1 mg/l and its recommended maximum value in municipal household water is 0.2 mg/l. Iron is the most common element along with manganese that impairs the quality of drinking water from wells.

In the quality requirements of drinking and household water, any health-based limit value for the maximum iron content is not defined. Instead, there is a quality recommendation that should be complied with. The quality recommendation is based on aesthetic qualities of water, i.e. odour, taste, and colour of water, but it also protects from health hazards. Recommendation for a maximum iron content can be considered 200 µg/l for water distributed by e.g. waterworks and 400 g/l for private wells.

BACKGROUND OF THE INVENTION

According to prior art, there are various types of water treatment methods and different types of water treatment equipment with specific purposes for treating various types of waters.

Throughout the world there are plenty of humus-rich groundwaters, which have high COD values (Chemical Oxygen Demand), high TOC values (Total Organic Carbon), and high iron and manganese contents. Humus obstructs the removal of iron and thus a simple iron removal method does not work in the treatment of humus-rich groundwaters. For humus-rich waters there are different types of water purification processes, of which presented below are the most common ones.

1) Chemical Precipitation with an Aluminium or Iron Salt
   This process includes i.a.:
      aeration, stirring, sedimentation, filtration;
      adding of alkaline agent in the beginning and either before or after the filtration;
      usually also adding of potassium permanganate to oxidize iron and manganese.

With this treatment it is possible to obtain high-quality water. Problems of this method are high investment and operating costs. In addition, the precipitation agent and potassium permanganate are costly chemicals. Operating also requires lots of personnel.

2) DynaSand Filtration
   This process includes i.a.:
      aeration;
      adding of an oxidizing agent e.g. potassium permanganate to oxidize iron and manganese;
      adding of an alkalizing agent to adjust the pH of the water being treated;
      adding of an aluminium or iron salt;
      DynaSand filtration;
      optionally adding of a post oxidizing agent.

This water treating process works only if the iron content of the water is not too high. In addition, investment and operating costs are quite high.

3) Slow Filtration
   This process includes i.a.:
      most of the iron is removed with contact filtration, which includes the following steps:
         aeration;
         adding of potassium permanganate;
         sand filtration;
      slow filtration.

Also slow filtration is quite costly a process. It requires, among other things, a very large basin. One problem is that, due to the large basin size, the basin does not include a rinsing system. Thus, iron that accumulates onto the surface of the basin, needs to be removed manually, which is slow and costly.

4) Membrane Filtration
   This process includes i.a.:
      reverse osmosis or nanofiltration;
      aeration;
      post-treatment, e.g. limestone filtration.

Problems with membrane filtration are high membrane costs. Also, there is only little user experience of the method to date. An additional problem is that the clogging of the filter is not always in control.

High investment costs, high operating costs, using of chemicals, and detrimental and unecological environmental effects can be considered common problems for all the solutions for removing iron and for purifying groundwater according to prior art.

In prior art, a lot of research has been done on iron removal from humus-rich waters, but a biological water purification solution according to the invention has not been found.

The Object of the Invention

The object of the present invention is to overcome the aforementioned drawbacks an to achieve a readily automatized, biological, affordable, simple, and reliable solution for removing iron and humus from groundwater. Another object of the present invention is to enable the treatment of iron-containing and humus-rich groundwater to obtain potable water in an environmentally friendly manner and with low costs.

The method according to the invention is characterized by what is presented in the characterization part of claim 1. Other embodiments of the invention are characterized by what is presented in the other claims.

BRIEF DESCRIPTION OF THE INVENTION

In the method of the invention, favourable conditions are created for iron bacteria, which conditions do not, however, promote chemical precipitation of iron. By keeping the pH value of the water suitably low, chemical precipitation of iron can be prevented and favourable conditions are created for iron bacteria to filter off the iron from the water biologically.

Typically, iron is removed from humus-rich water with the method of the invention biologically by conveying the water through a filter, which filter comprises filter material. The filter material may be, for example, natural sand, materials made of clay, or anthracite. According to the invention, the pH value of the water to be treated is lowered before conveying the water through the filter. Advantageously, the pH value of the water to be treated is lowered by adding acid to the water.

With the apparatus of the invention, iron is removed from humus-rich water biologically. Thus, the apparatus comprises at least a filter comprising filter material, through which filter the water to be treated is arranged to be conveyed. Advantageously, the apparatus comprises an acidification part to lower the pH value of the water to be treated.

Biological removal of iron and manganese from water as such is known in the prior art and is a standard procedure. The new method according to the invention is also based on biological treatment of water, but there are no methods comparable to the method according to the invention, and it differs from the existing biological waterworks.

Iron in water can be oxidized with air, either chemically or biologically. Chemical oxidation requires typically a pH value above 7. The precipitate formed in chemical precipitation is fine-grained and clogs the filter quickly. Thus, the filter or the filter material should be rinsed typically when the iron content reaches 0.2 kg per 1 $m^2$ of the filter material.

With biological filtration, iron penetrates deeper into the filter and the iron content can be over 1.0 kg per 1 $m^2$ of the filter material before the filter needs to be rinsed. With biological filtration the iron is also removed easier. Typically, in biological iron removal the oxygen content is low to prevent the chemical oxidation of iron. Usually, however, part of the iron still precipitates chemically, which impairs the performance of the filter.

Manganese is biologically removed separately after the removal of iron. Removal of manganese starts slowly, but humus does not adversely affect the removal.

With a standard biological removal of iron from humus-rich water, purification result is not adequate. Both iron and humus contents remain quite high. Iron content can be 1-2 mg/l after the treatment, when the recommended level is 0.2 mg/l. An iron content below 0.1 mg/l should be set as the target.

The method according to the invention relates to biological removal of iron and humus from humus-rich groundwater. In the method, the pH value of the water that is conveyed to the filter is adjusted by adding of acid to such a level that the pH value of the filtrated water, after the filter, is about 3.1-6.0, advantageously 4.1-4.5. The adjusting depends on the water that is used, and on its alkalinity, and contents of carbon dioxide, iron, humus, and other substances. Removal of iron, that occurs in the filter, decreases the pH value of the water. To prevent that, it is usually sufficient that the pH value of the groundwater to be filtrated is adjusted before the filtration to a value that is calculated beforehand and kept essentially unchanged, a value that depends on the flow rate of the water being treated, iron content of the water, and alkalinity of the water. After the filter, the pH value of the water is measured with a separate measuring instrument. Advantageously, the adjustment of the pH value is planned before the purification process case-specifically for each groundwater source, as the method depends on the pH value, iron content, and humus content of the groundwater. The groundwater source may be a well, for example. Utilization of wells is designed in a way that adverse water quality changes are prevented. A process design and a detailed design are usually made for each groundwater source before the iron removal process is put into operation. Consumption of acid is estimated based on the iron content of the water and thus the required level of acidification can also be estimated. This kind of predesigning is often sufficient, in which case feedback across the filter is not necessarily required to indicate the pH value of the water that has passed through the filter.

A feedback system is, however, a more advanced method to adjust the pH and/or alkalinity of the water to be treated. In that case, the pH value of the water going into the filter is adjusted based on the pH value of the outgoing, filtrated water. The method requires measuring of the pH value of the filtrated water and adjusting the quantity of acidification of the water that is conducted to the filter i.e. increasing or decreasing the amount of acid in the acidification step based on the measurement result of the feedback.

In the biological iron and humus removal method of the invention, favourable conditions are created for iron-precipitating bacteria, and they can thus optimally precipitate iron in the water when also humus is removing from the water.

The removal of iron decreases the alkalinity and, at the same time, the pH value of the water being treated, which is to say that the pH value of the water decreases in relation to the removal of iron inside the filter. Advantageously, the pH and/or alkalinity of the water being treated is adjusted to such a level that the pH value of the filtrated water, after the filter, is about 3.1-6.0, advantageously 4.1-4.5. The adjustment can be made in advance based on the properties of the water being treated or by means of a feedback system, like presented above. Iron content in each groundwater is a characteristic for each area and is not a variable for the operation of this invention. Therefore, adjusting the pH value automatically to be essentially unchanged in relation to the flow rate of the water, without a feedback system, is usually not problematic for adjusting the pH value to a proper value.

The iron is removed biologically from the water in the filter along with the humus by adhering to the filter material.

The filter is rinsed periodically and the ironhumus precipitate is removed, after which the filter can be reused.

A typical iron removal process according to the invention:
lowering the pH value with an acid, e.g. sulphuric acid;
aeration;
quick filtration.

If the pH value of the water is low, the iron cannot precipitate chemically. Thus, clogging of the filter remains scarce. The iron that precipitates directly onto the surface of the filter material removes humus from the water. Therefore, the humus does not obstruct the removal of iron and, as a result, essentially iron free water with low humus content is obtained. After this, the process depends on the other qualities of the water. The next step may be, for example, aeration and limestone filtration.

Advantages of the Invention

The solution of the invention has several advantages, which include among others:
lowering of the pH of the water with addition of an acid, by which chemical oxidation of iron is prevented and an efficient removal of humus is enabled;
precipitation agent (polyaluminium chloride, ferrous sulphate) is not required;
oxidation agent (e.g. potassium permanganate, sodium hypochlorite) is not required;
the process is environmentally friendly;
the amount of rinsing water is minute;
the process can be readily automatized, thus requiring little labour;
low investment costs;
operating costs are significantly lower.

The object and the main advantage of the solution according to the invention is to lower the operating costs and to reduce the adverse and unecological environmental effects by means of the automatized process and by not using costly and polluting chemicals. Another advantage is that it is affordable to build the apparatus due to its simple structure.

With the solution according to the invention it is possible to ensure a reliable, environmentally friendly, and affordable adoption of groundwater sources in new areas.

LIST OF FIGURES

Figure 2:
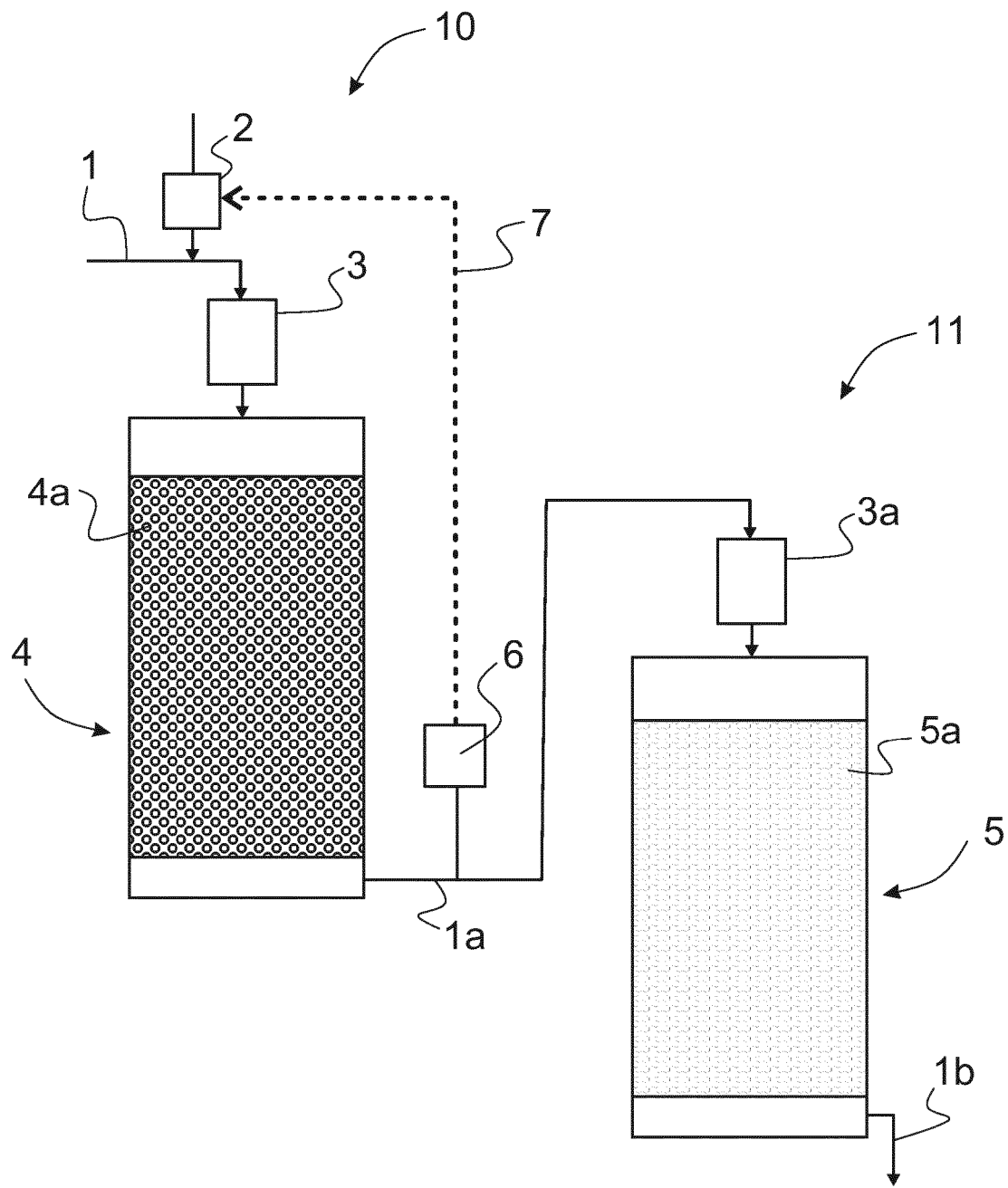
Figure 3:
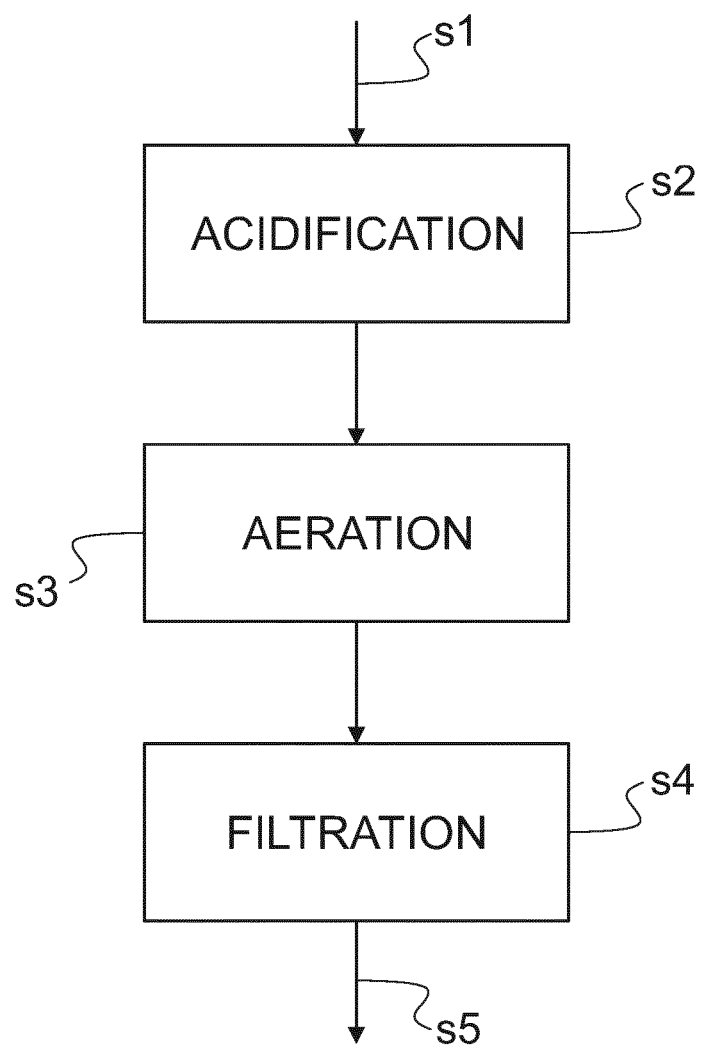

In the following, the invention will be described in detail by the aid of examples by referring to the attached simplified and diagrammatic drawings, wherein FIG. 1 presents simplified and diagrammatically a water purifying apparatus employed in the method according to the invention, FIG. 2 presents simplified and diagrammatically the apparatus according to FIG. 1 and, attached to it, a biofiltration or limestone filtration apparatus according to prior art, and FIG. 3 presents simplified and diagrammatically a method according to the invention for removing iron from humus-rich groundwater.

DETAILED DESCRIPTION OF THE INVENTION

FIG. 1 presents an advantageous apparatus 10 according to the invention for removing iron and humus biologically from groundwater. Advantageously, the apparatus comprises an inlet 1 for the water to be treated, through which the water to be treated is fed into the apparatus 10. The inlet 1 may be connected to, for example, a delivery pipe or piping. After the inlet 1, in the direction of motion of the water, the apparatus 10 comprises an acidification part 2, which is in contact with the water being treated and with which acid is added to the water being treated to lower the pH and/or alkalinity of the water. After the acidification part 2, in the direction of motion of the water, the apparatus 10 further comprises an aeration part 3, which comprises measuring and adjusting equipment for measuring the oxygen content of the water and for adjusting it to a desired level. The main purpose of the aeration part 3 is to add oxygen to the water being treated.

In the direction of motion of the water being treated, the apparatus 10 further comprises a filter 4, to which the water is arranged to be conducted after the aeration part 3. The filter 4 comprises filter material 4a that is advantageously sand, for example. It is not required to automatically adjust the amount of air of the water that is conducted to the filter 4. The apparatus 10 comprises, however, at least one oxygen meter for measuring the oxygen content of the filtrated water exiting the filter 4 and for monitoring the efficiency of the aeration. The oxygen content is not, however, critical provided that the oxygen content is sufficiently high. Advantageously, the oxygen content is defined case-specifically.

The apparatus 10 according to the invention further comprises an outlet 1a for the filtrated water, through which outlet 1a the filtrated water is arranged to be led for further treatment. The outlet 1a is advantageously placed in the filter 4 after the filter material 4a in the direction of motion of the water being treated.

FIG. 2 presents simplified and diagrammatically the apparatus 10 according to FIG. 1 and, attached to it, a further processing apparatus 11. The further processing apparatus 11 may be of prior art and it may comprise an aeration part 3a for adjusting the oxygen content of the water being treated. In addition, the further processing apparatus 11 may comprise a filter 5 after the aeration part 3a in the direction of motion of the water, which filter 5 comprises, for example, a limestone filter 5a to adjust the pH value of the water being treated. Advantageously, the filters 4 and 5 are connected to each other by, for example, connecting the outlet 1a of the filtrated water in the filter 4 to the inlet of the aeration part 3a of the further processing apparatus 11 with, for example, a suitable piping or channel system. In addition, the filter of the further processing apparatus 11 comprises an outlet 1b, through which the filtrated water is arranged to be led further to subsequent treatment. Advantageously, the outlet 1b is placed in the filter 5 after the filter material 5a in the direction of motion of the water being treated.

The biological iron and humus removal apparatus 10 presented in FIG. 2 is a modified version of the basic version and comprises a feedback system 7, which is connected between the outlet 1a of the filter 4 and the acidification part 2. The feedback system 7 comprises a measuring element 6 for measuring the pH value of the water, which measuring element 6 also comprises equipment for transmitting the measurement data to the acidification part 2. Correspondingly, the acidification part 2 comprises equipment for receiving the measurement data and for controlling the acidification part 2 based on the measurement data to batch the acid to be added to the water being treated. Advantageously, the amount of the acid to be added is strived to be kept such that the pH value of the water that has filtered through the filter 4 is about 3.1-6.0, advantageously 4.1-4.5, at the outlet 1a of the filter 4. The optimal value is sought case-specifically.

FIG. 3 presents diagrammatically and simplified a method according to the invention for removing iron from humus-rich groundwater.

In the first step s1 of the method according to the invention, the groundwater to be treated is led into the apparatus through the inlet 1, and in the second step s2, into the acidification part 2 to be acidified, where acid is added to the water to lower the alkalinity of the water. Advantageously, the acid to be added is sulphuric acid, but also other acids, such as hydrochloric acid, can be used instead of sulphuric acid. After the acidification, the acidified water is led, in the third step s3, into the aeration part 3, where the oxygen content of the water is measured and adjusted to a desired level. In the fourth step s4, the acidified and aerated water is led further into the filter 4, where the iron and humus of the water being treated are filtered off with the filter material 4a, advantageously sand, inside the filter 4. In the filter 4, the iron is removed from the water as it precipitates when iron bacteria oxidize it biologically and, at the same time, the precipitated iron takes humus with it and both the iron and humus adhere to the filter material 4a. After the filtration, the water being treated is removed from the apparatus 10 in the fifth step s5 through the outlet 1a and is led for further treatment.

The adjustments of the acidification, aeration, and flow rate of the water are advantageously performed beforehand by measuring in such a way that, when passing through the filter 4, the iron and humus contents and alkalinity of the water, which alkalinity can be measured indirectly with the pH value of the filtrated water, are decreased to the desired values.

As presented above, the pH value and/or alkalinity of the groundwater being treated is advantageously adjusted to such a level that the pH value of the filtrated water, after the filter 4, is about 3.1-6.0, advantageously 4.1-4.5. Because the iron content in each groundwater is a characteristic for each area and it is not a variable for the operation of this invention, the adjustment of the pH value can be arranged automatically to be essentially unchanged in relation to the flow rate of the water. Thus, the adjustment can be calculated beforehand based on the properties of the water to be treated by, for example, measuring the pH value, iron content, alkalinity, humus content, and flow rate of the water, and by adjusting the acidification and aeration, and the composition and amount of the filter material such that, as a result, filtrated water that is essentially free from iron and humus is obtained, the pH value of which filtrated water is within the desired range. Advantageously, this kind of adjustment that is performed in advance is readjusted occasionally with new measurements and tests.

If desired, a feedback system 7, which is advantageously connected between the outlet 1a of the filter 4 and the acidification part 2 may be attached to the biological iron and humus removal apparatus 10 according to the invention. In that case, the acidification of the water being treated can be adjusted accurately to obtain filtrated water of uniform quality even if the properties of the incoming water change for some reason or if the filtering properties of the filter material 4a change as a result of use. In that case, the pH value of the water coming out of the outlet 1a of the apparatus 10 is measured and the measurement data is transmitted to the acidification part 2 either continuously or periodically to be used as adjustment data, where in the acidification part 2 the amount of the acid that is added to the water is adjusted based on the measurement results such that, at the outlet 1a of the filter 4, the pH value of the water that has filtered through the filter 4 is, as stably as possible, about 3.1-6.0, advantageously 4.1-4.5.

The basic idea of the invention is essentially a chemical free biological solution for removing iron and humus, which comprises at its simplest only an acidification step s2, an aeration step s3, and a filtration step s4 without any chemical treatments.

It is obvious to the person skilled in the art that the invention is not restricted to the examples described above but that it may be varied within the scope of the claims presented below.

It is also obvious to the person skilled in the art that the filters of the iron removal apparatus and the further processing apparatus may be, for example, filter elements.

What is claimed is:

1. A method for treating humus-rich water, with which method iron is removed from the humus-rich water biologically, and in which method the humus-rich water is conveyed through a filter, which filter comprises filter material, wherein before conveying the humus-rich water through the filter, the pH value of the humus-rich water is lowered so that the pH value of the humus-rich water that has been filtered through the filter is 3.1-6.0, iron is removed from the humus-rich water as it precipitates when iron bacteria oxidize it biologically, the precipitated iron binds humus and both the iron and humus adhere to the filter material.

2. The method according to claim 1, wherein the pH value of the humus-rich water is lowered by adding acid to the humus-rich water.

3. The method according to claim 2, wherein the acid is sulphuric acid or hydrochloric acid.

4. The method according to claim 2, wherein quality characteristics of the humus-rich water are measured to determine a required amount of the acid to be added to the humus-rich water to achieve the iron removal.

5. The method according to claim 4, wherein the required amount of acid to be added to the humus-rich water is calculated based on the quality characteristics of the humus-rich water before the iron removal is put into operation.

6. The method according to claim 2, wherein an amount of the acid to be added to the humus-rich water is adjusted by feedback system by measuring the pH value of the humus-rich water that has been filtered through the filter.

7. The method according to claim 1, wherein the humus-rich water is aerated before humus-rich water is conveyed through the filter.

8. The method according to claim 1, wherein a process design is made for the iron removal before the iron removal is put into operation, in which process design, one or more of the following quality characteristics of the humus-rich water are measured: iron content, oxygen content, pH value, alkalinity, carbon dioxide content, and TOC.

9. The method according to claim 6, wherein the amount of the acid to be added to the humus-rich water is kept such that the pH value of the humus-rich water that has been filtered through the filter is 4.1-4.5.

10. The method according to claim 1, wherein the filter is a rinseable filter.

* * * * *